(12) United States Patent
Chasnis, II

(10) Patent No.: US 10,835,046 B2
(45) Date of Patent: Nov. 17, 2020

(54) OUTDOOR FURNITURE CONTAINING A FORTIFIED DROP BOX FOR THE EXTERIOR OF A HOME AND METHOD OF USE THEREOF

(71) Applicant: John J. Chasnis, II, Charlotte, NC (US)

(72) Inventor: John J. Chasnis, II, Charlotte, NC (US)

(*) Notice: Subject to any disclaimer, the term of this patent is extended or adjusted under 35 U.S.C. 154(b) by 0 days.

(21) Appl. No.: 16/167,522

(22) Filed: Oct. 22, 2018

(65) Prior Publication Data
US 2020/0121088 A1 Apr. 23, 2020

(51) Int. Cl.
*A47C 7/62* (2006.01)
*A47G 29/124* (2006.01)
*E05B 37/00* (2006.01)
*G07C 9/00* (2020.01)
*F25D 31/00* (2006.01)
*G01S 17/04* (2020.01)

(52) U.S. Cl.
CPC ............ *A47C 7/628* (2018.08); *A47G 29/124* (2013.01); *E05B 37/0037* (2013.01); *F25D 31/006* (2013.01); *G01S 17/04* (2020.01); *G07C 9/00912* (2013.01); *F25D 2331/80* (2013.01)

(58) Field of Classification Search
CPC ... A47C 7/628; A47G 29/124; E05B 37/0037; F25D 31/006; F25D 2331/80; G01S 17/026; G07C 9/00912
See application file for complete search history.

(56) References Cited

U.S. PATENT DOCUMENTS

| | | | |
|---|---|---|---|
| 5,458,395 A * | 10/1995 | Skarda, Jr. | ............... A47C 7/62 297/173 |
| 7,175,071 B1 | 2/2007 | Slagle et al. | |
| 8,358,195 B2 | 1/2013 | Giles | |
| 8,358,199 B2 | 1/2013 | Nesling | |
| 9,364,112 B2 | 6/2016 | Sundaresan | |
| 9,371,681 B2 | 6/2016 | Tompkins | |
| 9,630,757 B1 | 4/2017 | Capous | |
| 10,362,889 B2 * | 7/2019 | Dehner | ................... E05G 1/005 |
| 2001/0045449 A1 | 11/2001 | Shannon | |
| 2005/0127725 A1 * | 6/2005 | Satani | .................... B60N 2/305 297/188.08 |
| 2014/0008246 A1 * | 1/2014 | Pfeiffer | ................. A45C 11/00 206/1.5 |
| 2017/0251856 A1 | 9/2017 | Schaible | |
| 2018/0005183 A1 | 1/2018 | Nguyen et al. | |

(Continued)

*Primary Examiner* — Philip F Gabler
(74) *Attorney, Agent, or Firm* — Jeffrey C. Watson; Mathew L. Grell; Grell & Watson Patent Attorneys LLC

(57) ABSTRACT

Outdoor furniture for an exterior of a home includes a piece of outdoor furniture with a fortified drop box contained therein. The fortified drop box has a lid configured to open for gaining access to the fortified drop box. The lid of the fortified drop box is also configured to close for sealing the fortified drop box. A locking mechanism is included with the fortified drop box that is configured for securing the fortified drop box with the lid closed. The locking mechanism of the fortified drop box is also configured to selectively unlock for accessing the fortified drop box through the lid. Wherein, the piece of outdoor furniture containing the fortified drop box is configured and shaped like functional outdoor furniture.

2 Claims, 8 Drawing Sheets

(56) References Cited

U.S. PATENT DOCUMENTS

| | | |
|---|---|---|
| 2018/0053365 A1 | 2/2018 | Bode et al. |
| 2018/0070753 A1 | 3/2018 | Eveloff et al. |
| 2018/0108191 A9 | 4/2018 | Ho et al. |
| 2018/0172204 A1* | 6/2018 | Grappe ................ F16M 11/046 |
| 2018/0310714 A1* | 11/2018 | Becker .................. A47C 11/00 |
| 2019/0383085 A1* | 12/2019 | Hsu ........................ E05B 65/44 |

* cited by examiner

OUTDOOR FURNITURE CONTAINING A FORTIFIED DROP BOX FOR THE EXTERIOR OF A HOME AND METHOD OF USE THEREOF

FIELD OF THE DISCLOSURE

The present disclosure relates to fortified drop boxes for home deliveries of packages and the like. More specifically, the present disclosure is directed toward functional outdoor furniture, like a bench seat or table, containing a fortified storage drop box for the exterior of a home, like a porch, for securing package deliveries, and a method of use thereof.

BACKGROUND

Purchasing products online is a large business and is ever increasing in the recent years. These products are typically delivered as packages to customers' homes, including being left on their front porch or doorway. Many times they may be delivered during the day when the customer is not at home. Since these packages are left many times on porches or near the house in the yard they are prone to theft.

With the increasing use of on-line services for shopping, home deliveries of packages have increased dramatically in recent years. However, while the economy has shifted from "brick and mortar" stores to home delivery, the technology associated with ensuring delivery and preventing theft has not changed. Theft of packages from doorsteps and porches of homes have grown year after year in recent times with the ever increasing use of home deliveries. While a variety of lockable enclosures and receptacles, some with alarms and/or notification systems have been proposed, all known approaches have some deficiency in structure or operation, and are generally limited to specific enclosures or receptacles. In addition, these lockable enclosure and receptacles are undesirable to homes owners as they look out of place and unsightly on the home owner's doorstep, porch, driveway, or the like.

The instant disclosure is designed to address at least certain aspects of the problems or needs discussed above by providing outdoor furniture with a fortified drop box for the exterior of a home and method of use thereof.

SUMMARY

Accordingly, in one aspect, the present disclosure embraces outdoor furniture with a fortified drop box contained therein. The outdoor furniture may be functional outdoor furniture for the exterior of a home. The outdoor furniture may include a piece of outdoor furniture with the fortified drop box contained therein. The fortified drop box may have a lid configured to open for gaining access to the fortified drop box. The lid of the fortified drop box may also be configured to close for sealing the fortified drop box. A locking mechanism may be included with the fortified drop box that may be configured for securing the fortified drop box with the lid closed. The locking mechanism of the fortified drop box may also be configured to selectively unlock for accessing the fortified drop box through the lid. Wherein, the piece of outdoor furniture containing the fortified drop box may be configured and shaped like functional outdoor furniture.

In select embodiments of the instant outdoor furniture containing the fortified drop box for the exterior of a home, the piece of the outdoor furniture may be configured as a functional bench for seating. In these functional bench for seating embodiments, the lid of the fortified drop box may be the seat portion of the functional bench. In select embodiments, the functional bench for seating may include a back rest and side rails. In other select embodiments, the bench for seating may include only the seat portion of the functional bench and, thus, may not include a back rest and/or any side rails. In select other embodiments, the bench for seating may include planters attached to one or both sides of the bench.

In select embodiments of the instant outdoor furniture containing the fortified drop box for the exterior of a home, the piece of the outdoor furniture may be configured as a functional table. In these functional table embodiments, the lid of the fortified drop box may be the table top portion of the functional table.

One feature of the instant outdoor furniture containing the fortified drop box for the exterior of a home may be the locking mechanism may include a combination device. The combination device may be configured for unlocking the locking mechanism and accessing the fortified drop box, like by an owner to retrieve their securely delivered home packages inside the fortified drop box.

Another feature of the instant outdoor furniture containing the fortified drop box for the exterior of a home may be that the locking mechanism may include a scanner. The scanner may be configured for unlocking the locking mechanism and accessing the fortified drop box, like by a delivery company for securely delivering home packages. In addition, the piece of outdoor furniture may be configured to allow delivery companies to gain access to the fortified drop box via the barcode scanner in order to secure home delivered packages inside the piece of outdoor furniture. In select embodiments, the locking mechanism may be configured to be unlocked by the delivery company via a one-time barcode on the home delivered package or packages. This one-time barcode on the home delivered package(s) may be configured to be scanned by the scanner for unlocking the locking mechanism a single time.

Another feature of the instant outdoor furniture containing the fortified drop box for the exterior of a home may be that the locking mechanism may be powered by a battery power source or a wired alternating current power source.

Another feature of the instant outdoor furniture containing the fortified drop box for the exterior of a home may be the inclusion of a security system. The security system may be configured to prevent the piece of outdoor furniture from being stolen. In select embodiments, the security system may include a proximity sensor in communication with the piece of outdoor furniture. Furthermore, the proximity sensor may be configured to determine when the piece of outdoor furniture is removed from the exterior of the home.

Another feature of the instant outdoor furniture containing the fortified drop box for the exterior of a home may be the inclusion of an ergonomic lift. The ergonomic lift may be positioned inside the fortified drop box. The ergonomic lift may be configured to raise and lower home delivered packages on the ergonomic lift to a desired height.

Another feature of the instant outdoor furniture containing the fortified drop box for the exterior of a home may be the inclusion of a refrigerated compartment. The refrigerated compartment may be positioned inside the fortified drop box. The refrigerated compartment may be configured to hold home delivered refrigerated items. In select embodiments, the refrigerated compartment may include an openable refrigerator door with a handle configured to seal the refrigerated compartment when closed and to provide access to the refrigerated compartment when opened. The openable refrigerator door of the refrigerated compartment may be configured to be opened only when the lid of the fortified drop box is open. In select embodiments, the refrigerated compartment may be powered by an alternating current power supply.

In another aspect, the instant disclosure embraces a piece of outdoor furniture for an exterior of a home. The instant piece of outdoor furniture may be any of the various embodiments of the outdoor furniture shown and/or described herein. The instant piece of outdoor furniture for the exterior of home may have a fortified drop box contained within the piece of outdoor furniture. The fortified drop box may have a lid configured to open for gaining access to the fortified drop box and to close for sealing the fortified drop box. A locking mechanism may be included with the instant piece of outdoor furniture. The locking mechanism may be configured for securing the fortified drop box with the lid closed. The locking mechanism may also be configured to selectively unlock for accessing the fortified drop box through the lid. The locking mechanism may include a combination device configured for unlocking the locking mechanism and accessing the fortified drop box by the owner. The locking mechanism may also include a scanner configured for unlocking the locking mechanism and accessing the fortified drop box by a delivery company. Whereby, the piece of outdoor furniture may be configured to allow delivery companies to gain access to the fortified drop box via the barcode scanner in order to secure home delivered packages inside the piece of outdoor furniture. Wherein the locking mechanism may be configured to be unlock by the delivery company via a one-time barcode on the home delivered packages configured to be scanned by the scanner for unlocking the locking mechanism a single time. The locking mechanism may be powered by a battery power source or a wired alternating current power source. A security system may be included with the instant piece of outdoor furniture. The security system may be configured to prevent the piece of outdoor furniture from being stolen. The security system may include a proximity sensor in communication with the piece of outdoor furniture. Wherein, the proximity sensor may be configured to determine when the piece of outdoor furniture is removed from the exterior of the home. An ergonomic lift may be included with the instant piece of outdoor furniture. The ergonomic lift may be positioned inside the fortified drop box. The ergonomic lift may be configured to raise and lower home delivered packages to a desired height. A refrigerated compartment may also be included with the instant piece of outdoor furniture. The refrigerated compartment may be positioned inside of the fortified drop box. The refrigerated compartment may be configured to hold home delivered refrigerated items. The refrigerated compartment may include an openable refrigerator door configured to seal the refrigerated compartment when closed and to provide access to the refrigerated compartment when opened. The openable refrigerator door of the refrigerated compartment may be configured to be opened only when the lid of the fortified drop box is open. The refrigerated compartment may be powered by an alternating current power supply. Wherein, the piece of outdoor furniture may contain the fortified drop box and may be configured and shaped like functional outdoor furniture.

In select embodiments, the instant piece of outdoor furniture may be a functional bench for seating with a back rest and side rails where the lid of the fortified drop box is the seat portion of the functional bench.

In other select embodiments, the instant piece of outdoor furniture may be a functional bench for seating without out the back rest and side rails where the lid of the fortified drop box is the seat portion of the functional bench.

In other select embodiments, the instant piece of outdoor furniture may be a functional bench for seating with planters attached to one or both sides of the bench.

In other select embodiments, the instant piece of outdoor furniture may be a functional table where the lid of the fortified drop box is the table top.

In another aspect, the instant disclosure embraces a method of delivering packages inside outdoor furniture on an exterior of a home. In general, the instant method of delivering packages inside outdoor furniture on an exterior of a home includes the step of providing outdoor furniture for an exterior of a home in any of the various embodiments shown and/or described herein, including any of the various embodiments of the piece of outdoor furniture containing the fortified drop box shown and/or described herein. With this provided outdoor furniture containing the fortified drop box, the instant method of delivering packages inside outdoor furniture on an exterior of a home may include delivering home delivered packages to the home. This step of delivering home delivered packages to the home may include the steps of: unlocking the locking mechanism; opening the lid; inserting the home delivered packages inside the fortified drop box; closing the lid; and locking the locking mechanism for securing the home delivered packages inside the fortified drop box contained within the piece of outdoor furniture.

In select embodiments of the instant method of delivering packages inside outdoor furniture on an exterior of a home, when the locking mechanism of the provided outdoor furniture includes a combination device configured for unlocking the locking mechanism and accessing the fortified drop box by the owner, and a scanner configured for unlocking the locking mechanism and accessing the fortified drop box by a delivery company, the step of delivering home delivered packages to the home may further include the steps of: scanning a barcode on the home delivered packages for unlocking the lock via the delivery company; and entering a combination into the combination device for retrieving the home delivered packages from the fortified drop box via the owner.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-9, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Figure 1:
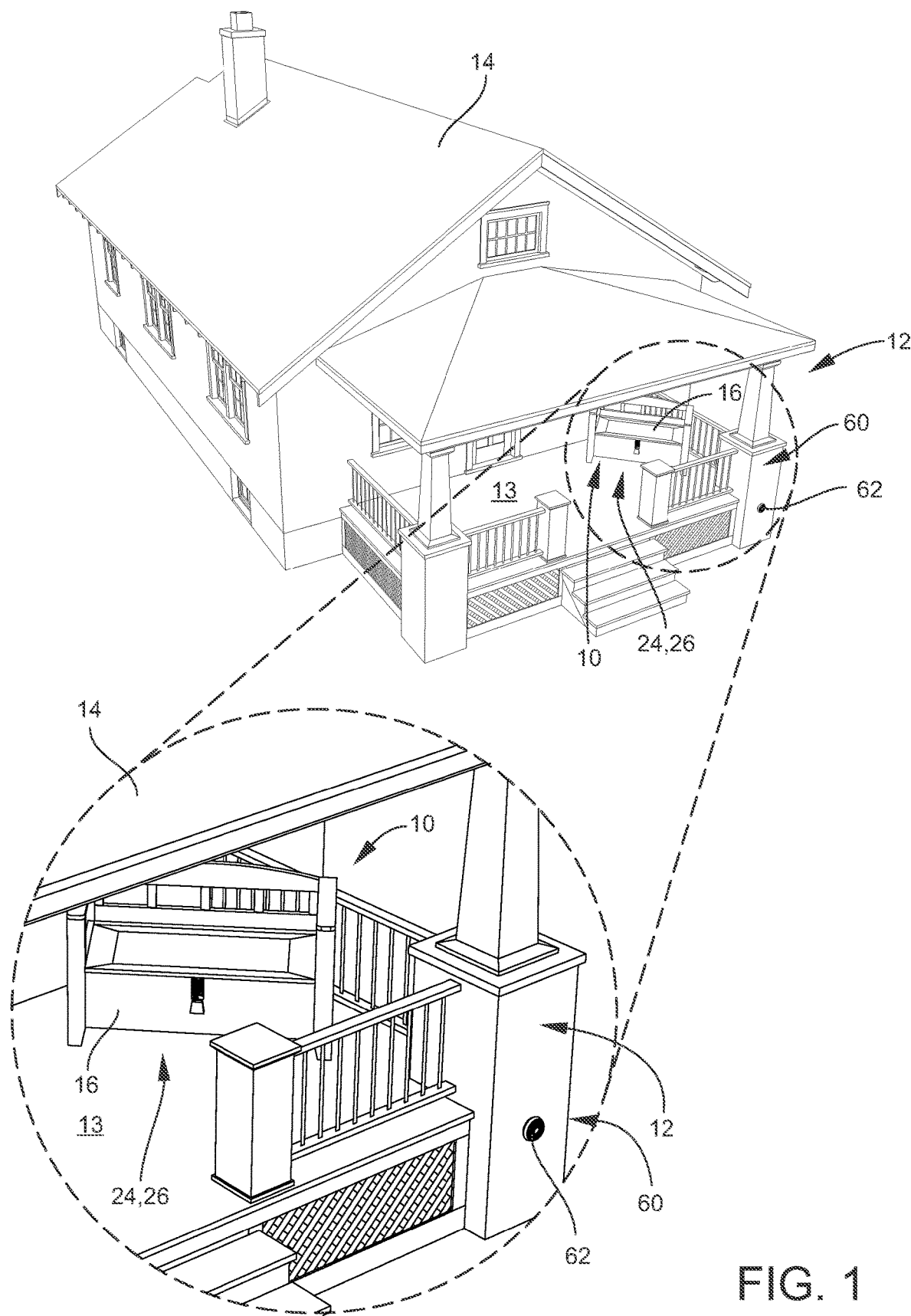
FIG. 1 is an environmental perspective view of the outdoor furniture containing the fortified drop box for the exterior of a home according to select embodiments of the instant disclosure with a zoomed in view showing the fortified drop box positioned on the porch of the home.

Referring now to FIGS. 1-8, in a possibly preferred embodiment, the present disclosure overcomes the above-mentioned disadvantages and meets the recognized need for such an apparatus or method by providing of outdoor furniture 10 containing fortified drop box 18 for exterior 12 of home 14. Outdoor furniture 10 with or containing fortified drop box 18 may be for providing a location on exterior 12 of home 14, like porch 13 as shown in FIG. 1, where home delivered packages 50 can be safely and securely delivered. Outdoor furniture 10 may be stand alone outdoor furniture or it may be integral or built into exterior 12 of home 14. Outdoor furniture 10 with or containing fortified drop box 18 may provide this safe and secure location for home delivered packages 50 while also be functional as outdoor furniture and being aesthetically pleasing to owner 44. Outdoor furniture 10 may be any functional outdoor furniture 24 for exterior 12 of home 14, including any seats, tables, chairs, decorations, the like, etc. that are intended to be functional as outdoor furniture but also contain fortified drop box 18. Outdoor furniture 10 may include piece 16 of outdoor furniture 10 with fortified drop box 18 contained therein.

Fortified drop box 18 may be includes inside piece 16 of outdoor furniture 10. Fortified drop box 18 may provide a safe and secure location inside of piece 16 of outdoor furniture 10 for delivering and storing of home delivered packages 50. Fortified drop box 18 may include any desired shape or size of a fortified drop box, or a drop box designed to reduce or prevent theft of home delivered packages 50. Fortified drop box 18 may have lid 20 configured to open for gaining access to fortified drop box 18. Lid 20 of fortified drop box 18 may also be configured to close for sealing fortified drop box 18. Lid 20 may be a standard hinged lid of a drop box or other various types of lids designed to open and close for accessing and securing the content of fortified drop box 18.

Locking mechanism 22 may be included with outdoor furniture 10 containing fortified drop box 18. Locking mechanism 22 may be for securely locking lid 20 on fortified drop box 18. Locking mechanism 22 may also be for allowing select access to unlock lid 20 from fortified drop box 18. As such, locking mechanism 22 may be configured for securing fortified drop box 18 with lid 20 closed. In addition, locking mechanism 22 of fortified drop box 18 may be configured to selectively unlock for accessing fortified drop box 18 through lid 20. Locking mechanism 22 of fortified drop box 18 may be selectively unlocked by any means, including but not limited to, any combinations, keypads, keys, scanners, the like, biometrics, passwords, etc.

Figure 2:
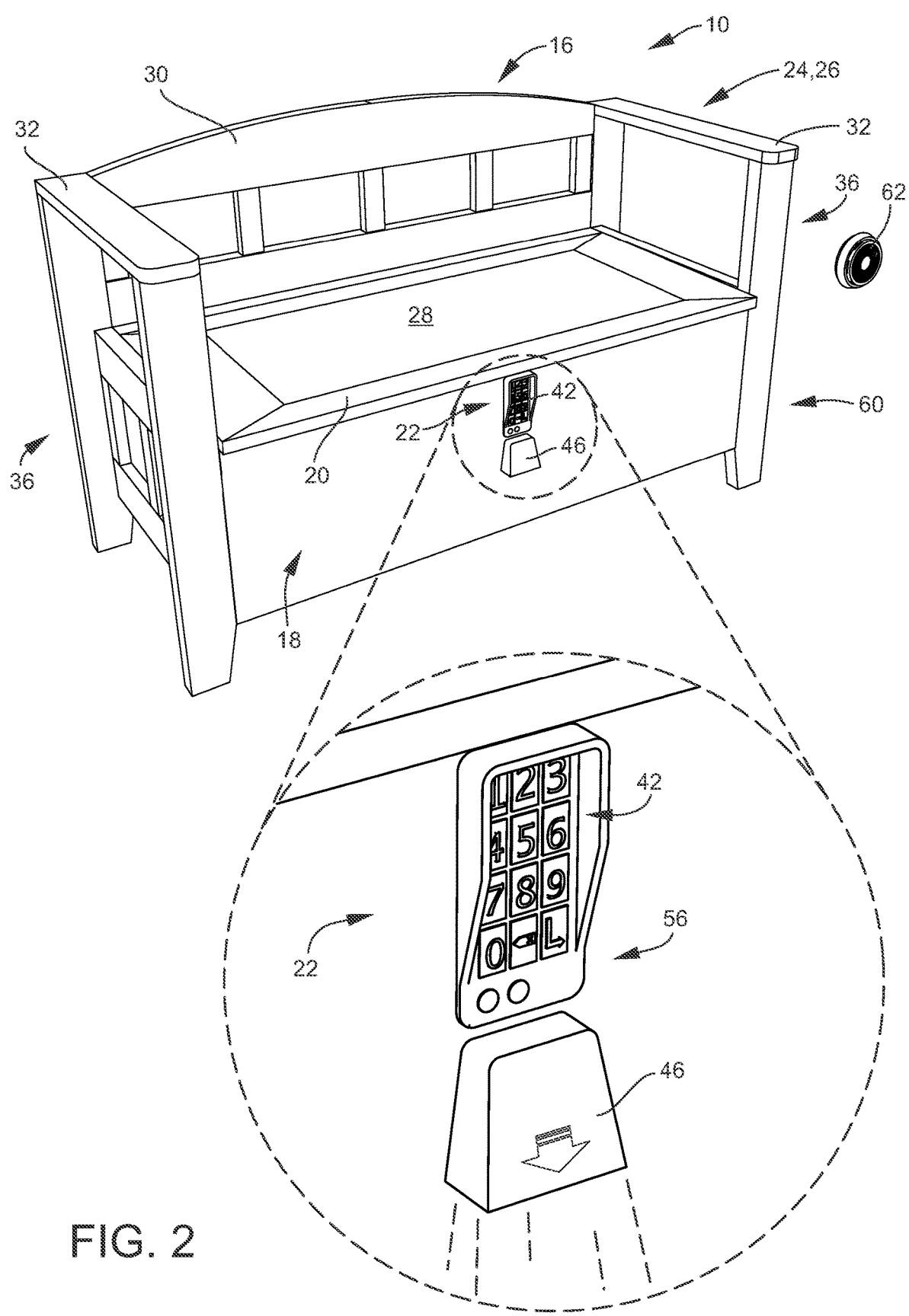
FIG. 2 is a perspective front view of the outdoor furniture containing the fortified drop box for the exterior of a home from FIG. 1.
Figure 3:
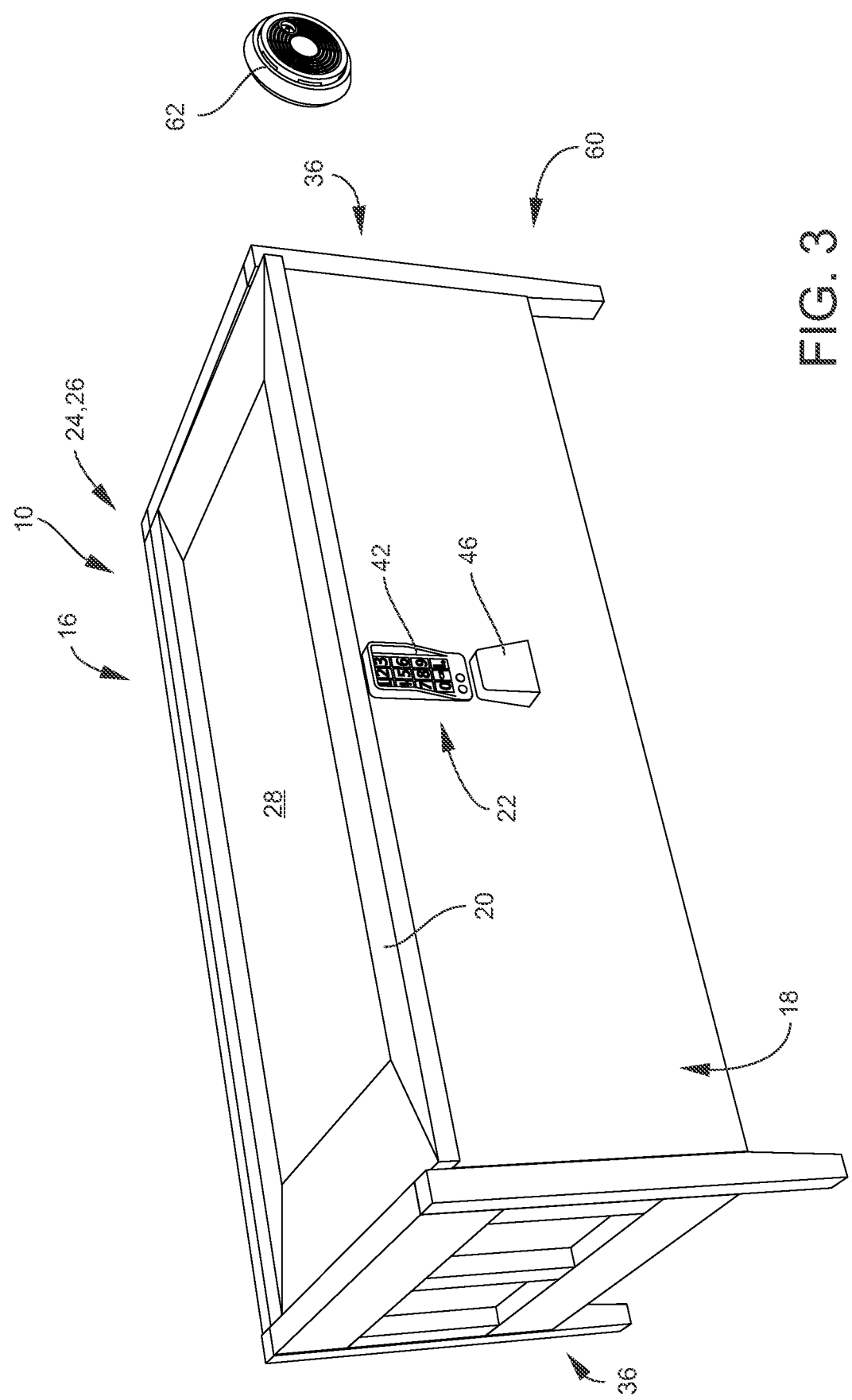
FIG. 3 is a perspective front view of the outdoor furniture containing the fortified drop box for the exterior of a home according to select embodiments of the instant disclosure with no side rails or back support.
Figure 4:
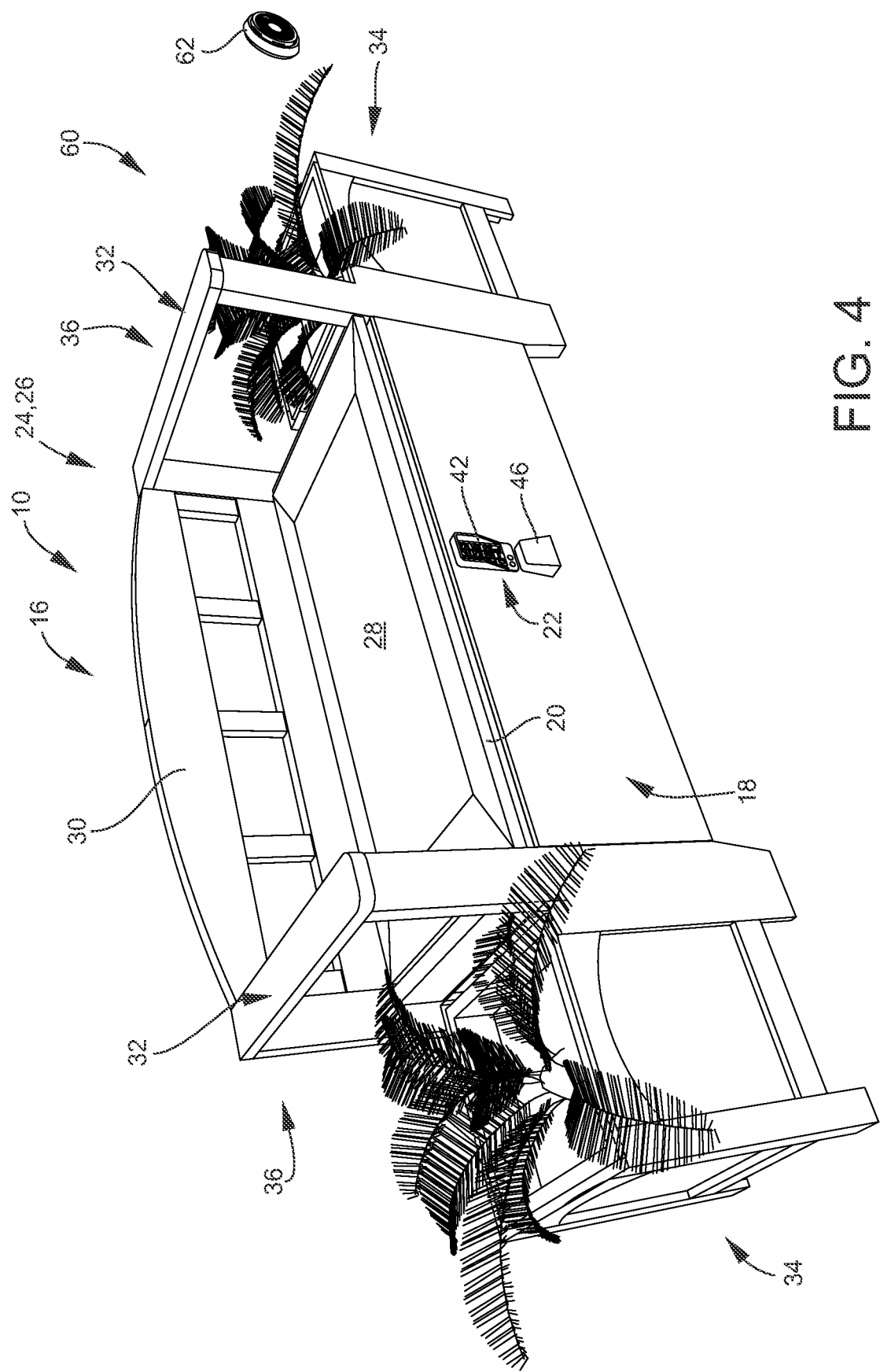
FIG. 4 is a perspective front view of the outdoor furniture containing the fortified drop box for the exterior of a home according to select embodiments of the instant disclosure with side planters.

Piece 16 of outdoor furniture 10 containing fortified drop box 18 may be configured and shaped like functional outdoor furniture 24. In select embodiments of the instant outdoor furniture 10 containing fortified drop box 18 for exterior 12 of home 14, as shown in FIGS. 1-4 and 7-8, piece 16 of outdoor furniture 10 may be configured as functional bench 26 for seating. Functional bench 26 may include any standard components of a functional bench for seating, including, but not limited to, any legs, arms/rails, back rests, seat bottoms or portions, the like, etc. Functional bench 26 may be designed as any shape or size of a functional bench or seat of outdoor furniture. As shown in the figures, in these functional bench 26 for seating embodiments, lid 20 of fortified drop box 18 may be the seat portion 28 of functional bench 26. As such, seat portion 28 may be configured to open for gaining access to fortified drop box 18. Seat portion 28 may also be configured to close for sealing fortified drop box 18. Seat portion 28 may be a standard seat portion or bottom, or other various types of seat bottoms for benches, designed to open and close for accessing and securing the content of fortified drop box 18. Referring now specifically to FIGS. 1-2, 4, and 7-8, in select embodiments, functional bench 26 for seating may include back rest 30 and side rails 32. Back rest 30 may be any raised portion behind seat portion 28, including any design, size or shape of back rest 30. Side rails 32 may be any raised portions, arm rests, the like, etc. on sides 36 of functional bench 26, including any design, size or shape of side rails 32. Referring now specifically to FIG. 3, in other select embodiments, functional bench 26 for seating may include only seat portion 28 of functional bench 26 and, thus, may not include back rest 30 and/or any side rails 32. As a result, functional bench 26 may be designed in various forms of seats or benches which may or may not include any back rest 30 and/or any side rails 32. Referring now specifically to FIG. 4, in select other embodiments, functional bench 26 for seating may include planters 34. Planters 34 may be positioned on sides 36. In select embodiments, planters 34 may be attached to one or both sides 36 of functional bench 26. Planters 34 may be any design or shape of planters or boxes designed for decoration and/or holding decorations, like real or fake plants or bushes.

Figure 5:
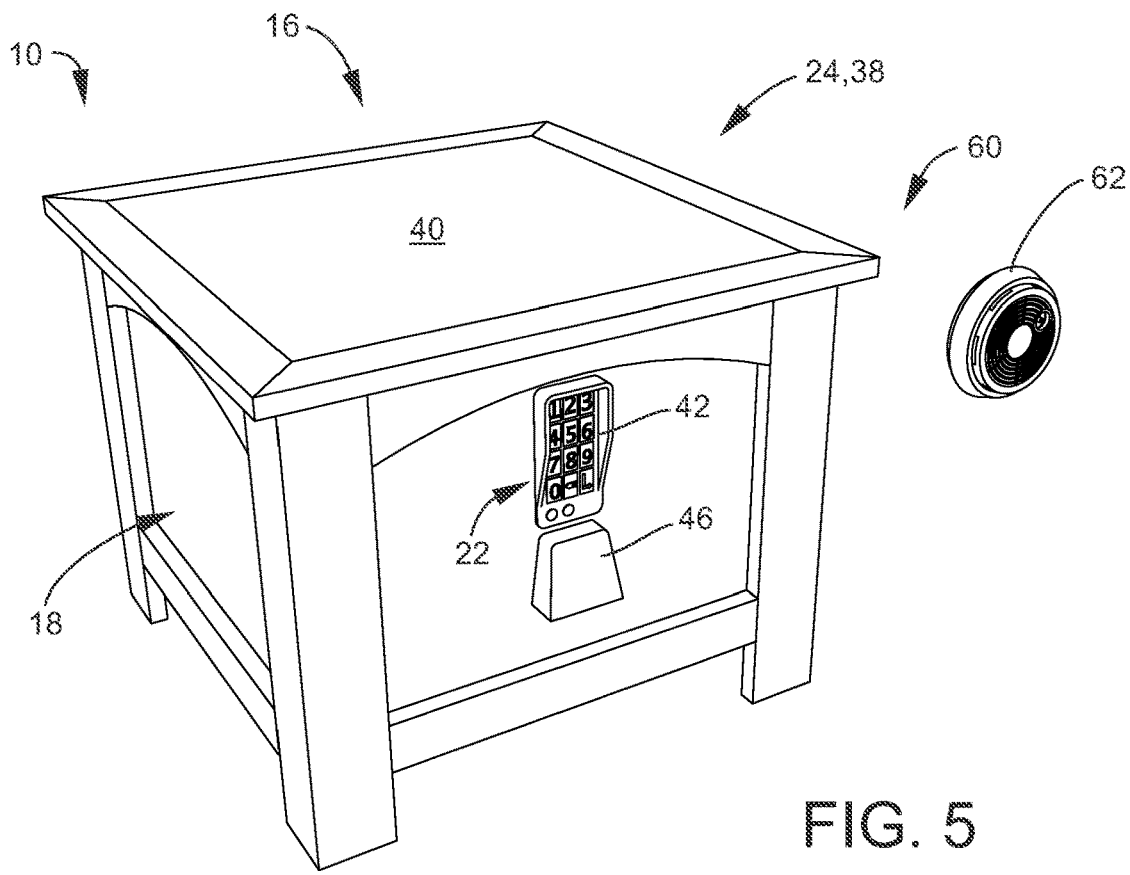
FIG. 5 is a perspective front view of the outdoor furniture containing the fortified drop box for the exterior of a home according to select embodiments of the instant disclosure presented as a side table.
Figure 6:
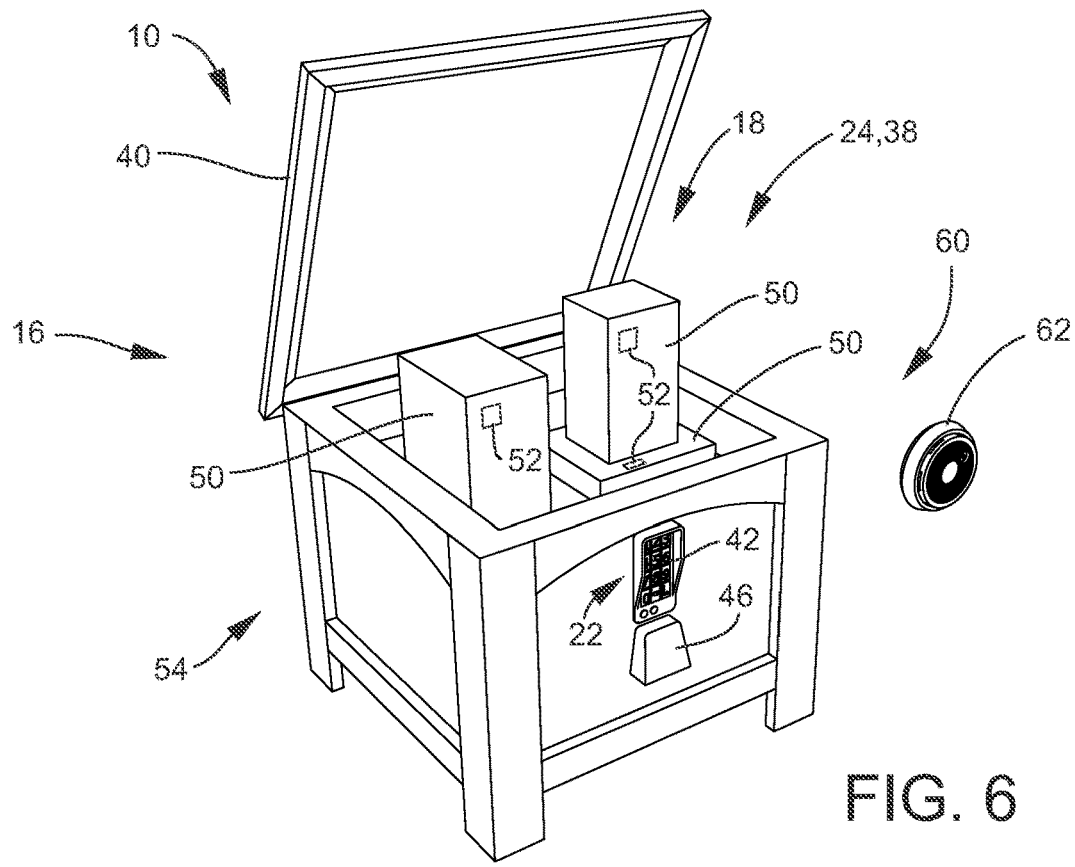
FIG. 6 is a perspective front view of the outdoor furniture containing the fortified drop box for the exterior of a home from FIG. 5 as a side table with the top hinged open.

Referring now specifically to FIGS. 5 and 6, in select embodiments of the instant outdoor furniture 10 containing fortified drop box 18 for exterior 12 of home 14, piece 16 of outdoor furniture 10 may be configured as functional table 38. Functional table 38 may include any standard components of a functional table, including, but not limited to, any legs, tops, rails, the like, etc. Functional table 38 may be designed as any shape or size of a functional table or stand of outdoor furniture. As shown in FIGS. 5 and 6, in these functional table 38 embodiments, lid 20 of fortified drop box 18 may be table top portion 40 of functional table 38. As such, table top portion 40 may be configured to open for gaining access to fortified drop box 18. Table top portion 40 may also be configured to close for sealing fortified drop box 18. Table top portion 40 may be a standard table top or other various types of table tops designed to open and close for accessing and securing the content of fortified drop box 18.

Combination device 42 may be included with locking mechanism 22 of fortified drop box 18 inside piece 16 of outdoor furniture 10. See FIGS. 2-8. Combination device 42 may be for entering a passcode or combination into a keypad, or other like device, for unlocking locking mechanism 22 and accessing fortified drop box 18. As an example, combination device 42 may be set by owner 44 and may be used by owner 44 for accessing delivered home packages 50 inside fortified drop box 18. As such, combination device 42 may be configured for selectively unlocking locking mechanism 22 and accessing fortified drop box 18, like by owner 44, to retrieve their securely delivered home packages 50 inside fortified drop box 18.

Scanner 46 may also be included with locking mechanism 22 of fortified drop box 18 inside piece 16 of outdoor furniture 10. See FIGS. 2-8. Scanner 46 may be for scanning any code, biometric, the like, etc., for unlocking locking mechanism 22 and accessing fortified drop box 18. As an example, scanner 46 may be a barcode scanner used by delivery company 48 for accessing fortified drop box 18 for inserting and delivery of delivered home packages 50 inside fortified drop box 18. As such, scanner 46 may be configured for selectively unlocking locking mechanism 22 and accessing fortified drop box 18, like by delivery company 48 for securely delivering home packages 50. In addition, piece 16 of outdoor furniture 10 may be configured to allow delivery companies to gain access to fortified drop box 18 via barcode scanner 46 in order to secure home delivered packages inside piece 16 of outdoor furniture 10. In select embodiments, locking mechanism 22 may be configured to be opened by delivery company 48 via one-time barcode 52 on home delivered package or packages 50 (see FIGS. 6, 7 and 8). This one-time barcode 52 on home delivered package(s) 50 may be configured to be scanned by scanner 46 for unlocking locking mechanism 22 single time 54.

Figure 8:
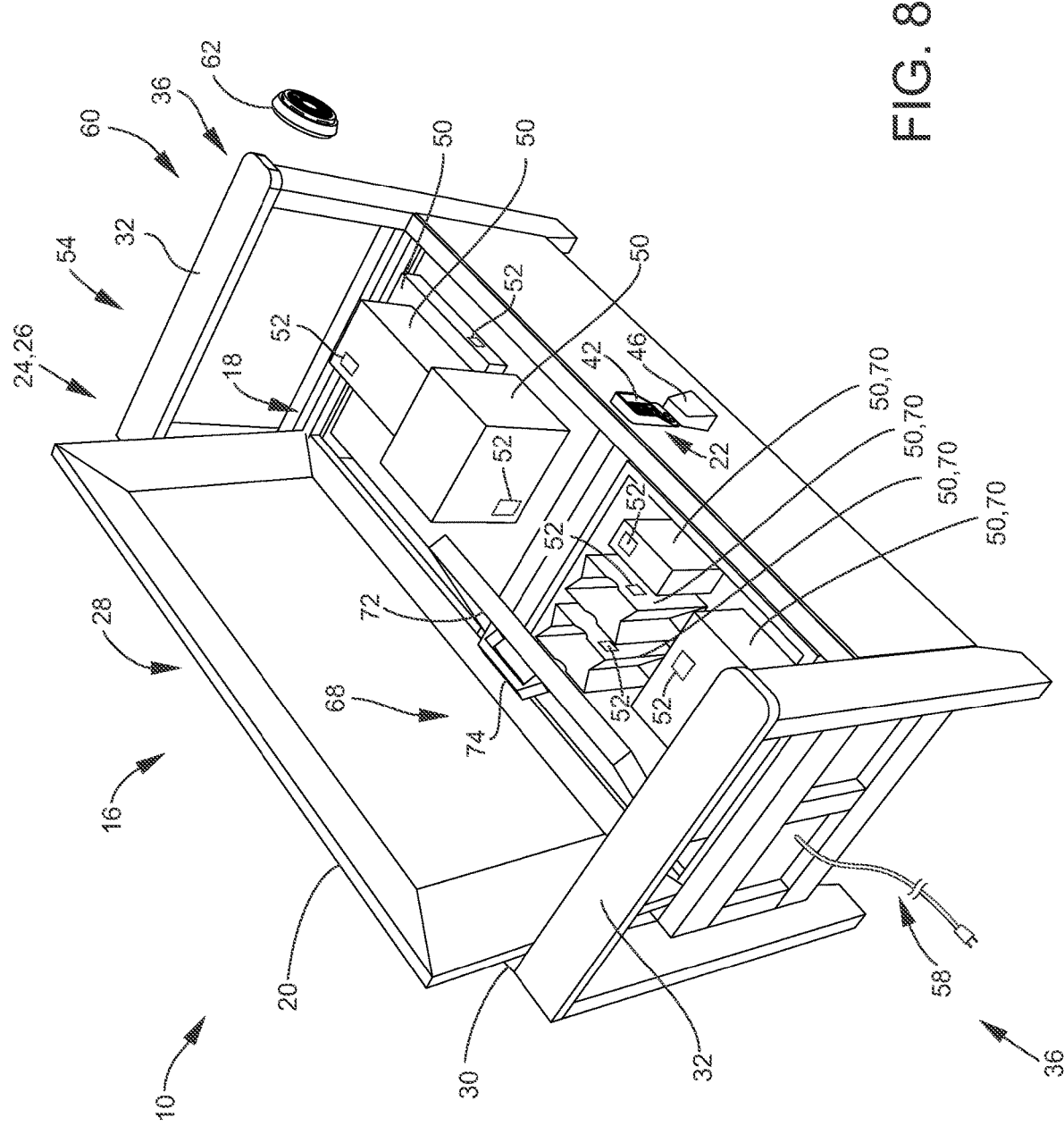
FIG. 8 is a perspective front view of the outdoor furniture containing the fortified drop box for the exterior of a home according to select embodiments of the instant disclosure with a refrigerated compartment for groceries.

Fortified drop box 18 inside piece 16 of outdoor furniture 10 may be powered by any means. This may include, but is not limited to, the powering of locking mechanism 22, including, but not limited to, combination device 42 and/or scanner 46. In select embodiments, locking mechanism 22 of fortified drop box 18 may be powered by battery power source 56, as shown in FIG. 2. Battery power source 56 may be rechargeable, like via solar charging and/or wired charging. Alternatively, battery power source 56 may not be rechargeable, where battery power source 56 requires battery changes. In other select embodiments, locking mechanism 22 of fortified drop box 18 may be powered by wired alternating current power source 58, as shown in FIG. 8. Alternating current power source 58 may be direct wired to home 14 or it may be plugged into an outlet.

Security system 60 may be included with piece 16 of outdoor furniture 10 containing fortified drop box 18. See FIGS. 1-8. Security system 60 may be for preventing theft or removal of piece 16 of outdoor furniture 10 from exterior 12 of home 14. Security system 60 may be any device or devices configured for preventing theft or removal of piece 16 from exterior 12 of home 14. As such, security system 60 may be configured to prevent piece 16 of outdoor furniture 10 from being stolen. In select embodiments, as shown in FIGS. 1-8, security system 60 may include proximity sensor 62. Proximity sensor 62 may be in communication with piece 16 of outdoor furniture 10. Proximity sensor 62 may communication with any part of piece 16, including, but not limited to, combination device 42, scanner 46, etc. Proximity sensor 62 may be configured to determine when piece 16 of outdoor furniture 10 is removed from exterior 12 of home 14. As an example, referring to FIG. 1, proximity sensor 62 may be positioned discretely on the side of porch 13. Whereby, if a thief were to try and remove piece 16 of outdoor furniture 10 containing any home delivered packages 50 from porch 13 of home 14, proximity sensor 62 would recognize the theft once piece 16 is a set distance from proximity sensor 62. Security system 60 may include any device or means for alerting owner 44, the authorities, or the like when a theft is occurring. In addition, security system 60 may include a speaker or horn for providing an audible alarm once a theft is occurring.

Figure 7:
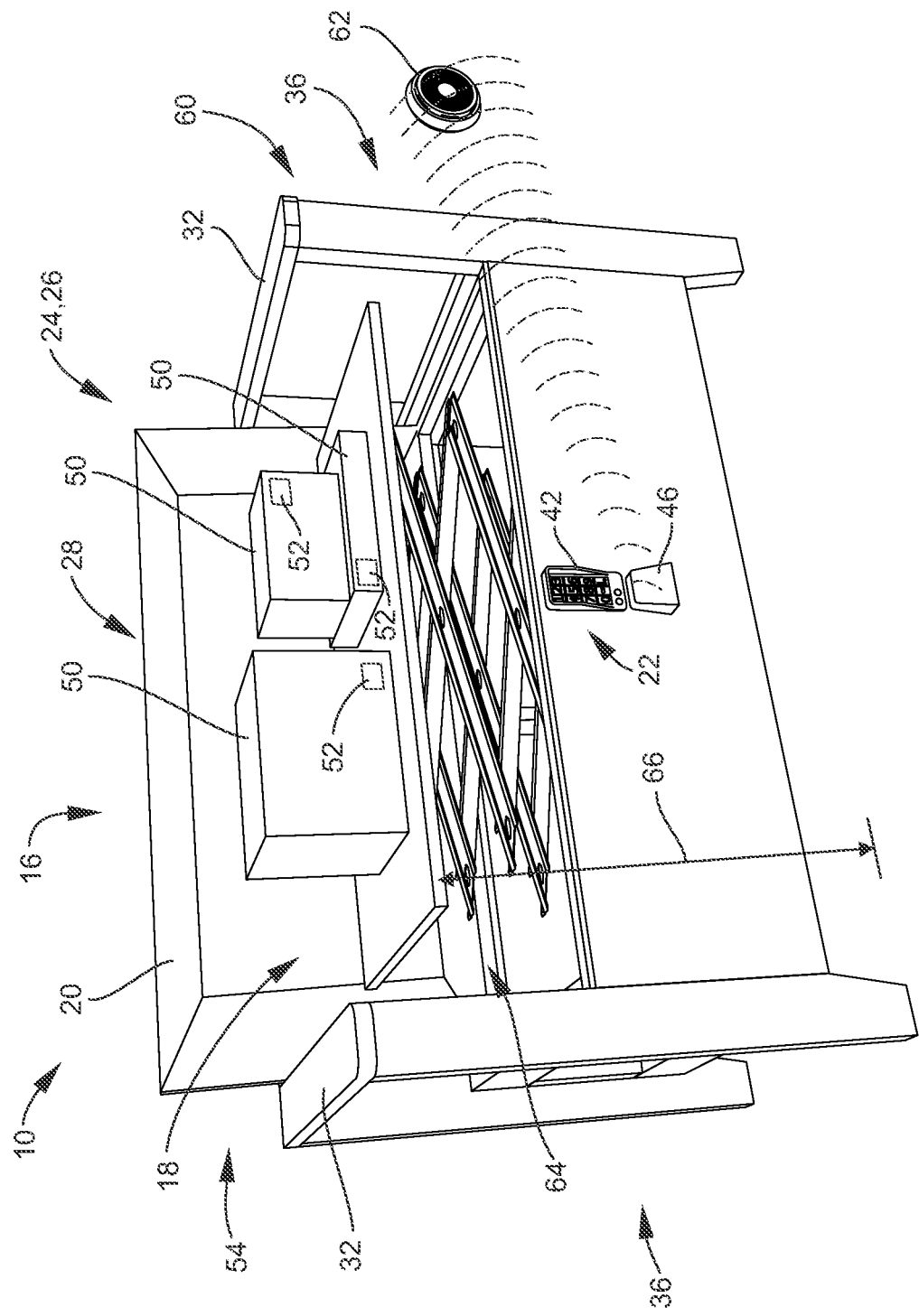
FIG. 7 is a perspective front view of the outdoor furniture containing the fortified drop box for the exterior of a home according to select embodiments of the instant disclosure with the ergonomic lift raised to the top according to select embodiments of the instant disclosure.

Referring now to FIG. 7, another feature of the instant outdoor furniture 10 containing fortified drop box 18 for exterior 12 of home 14 may be the inclusion of ergonomic lift 64. Ergonomic lift 64 may be positioned inside fortified drop box 18 contained within piece 16 of outdoor furniture 10. Ergonomic lift 64 may be for raising and lowering home delivered packages 50 inside fortified drop box 18. As such, ergonomic lift 64 may be configured to raise and lower home delivered packages 50 on ergonomic lift 64 to desired height 66. Ergonomic lift 64 may thus be configured for making the insertion and removal of home delivered packages 50 to and from fortified drop box 18 more user friendly, i.e. easier on the back. Ergonomic lift 64 may be any style or type of ergonomic lift, including, but not limited to, a scissor style ergonomic lift as shown in FIG. 7. In select embodiments, ergonomic lift 64 may be manually operated, like via foot pedals or handles. In other select embodiments, ergonomic lift 64 may be automatically operated where ergonomic lift may be set to a specific desired height 66 when lid 20 is opened via combination device 42. As such, ergonomic lift 64 may communicate with locking mechanism 22 including combination device 42 and/or scanner 46 for determining when and how much force is required to raise home delivered packages 50 to desired height 66.

Referring now specifically to FIG. 8, another feature of the instant outdoor furniture 10 containing fortified drop box 18 for exterior 12 of home 14 may be the inclusion of refrigerated compartment 68. Refrigerated compartment 68 may be positioned inside fortified drop box 18. Refrigerated compartment 68 may be configured to hold home delivered refrigerated items 70. As shown in FIG. 8, in select embodiments, refrigerated compartment 68 may include openable refrigerator door 72 with handle 74 configured to seal refrigerated compartment 68 when closed and to provide access to refrigerated compartment 68 when opened. In select embodiments, as shown with the configuration of FIG. 8, openable refrigerator door 72 of refrigerated compartment 68 may be configured to be opened only when lid 20 of fortified drop box 18 is open. As such, refrigerated compartment 68 may only be opened and accessed with lid 20 of fortified drop box is open. Refrigerated compartment 68 may be powered by alternating current power supply 58.

Figure 9:
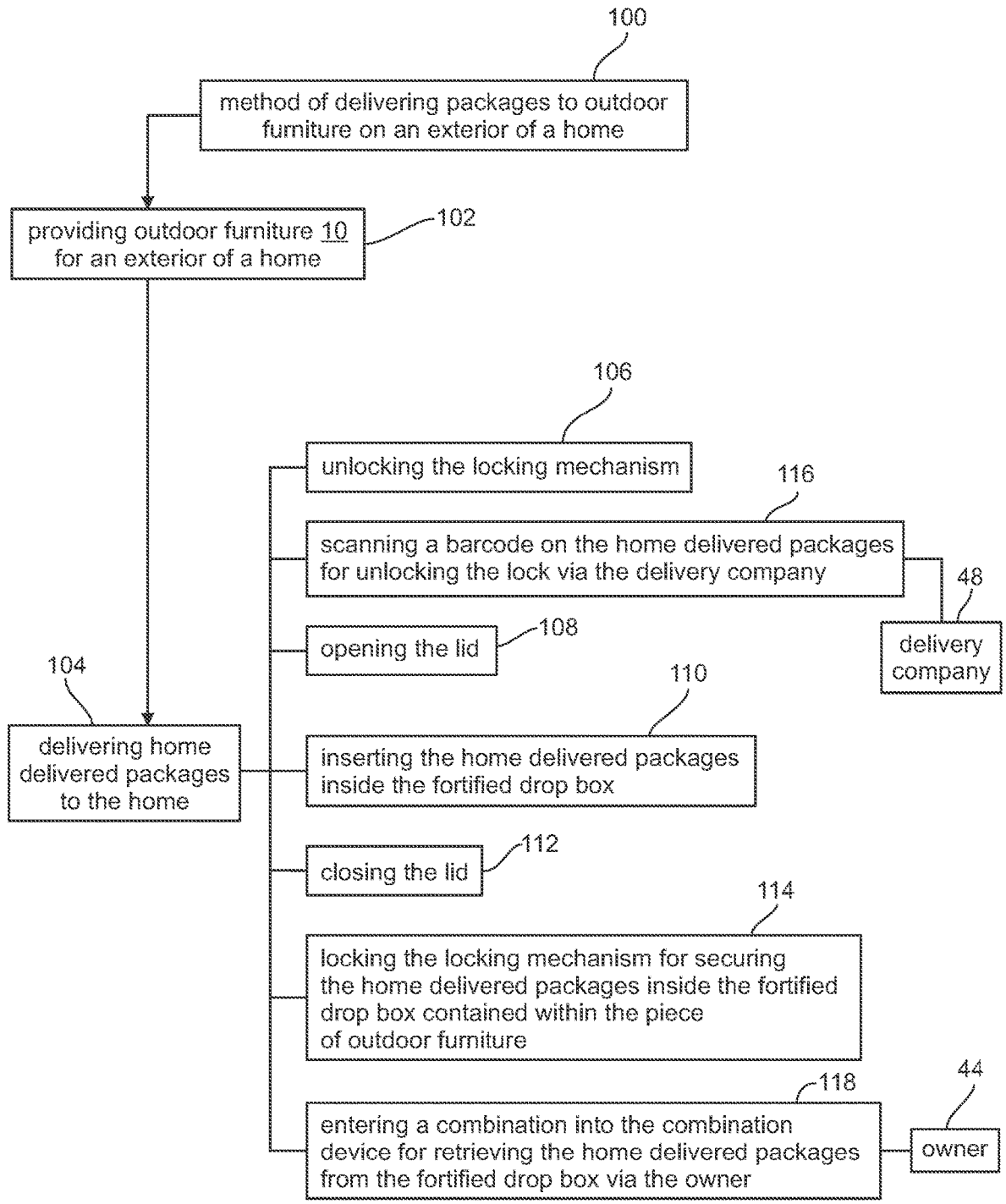
FIG. 9 is a flow diagram of the method of delivering packages inside outdoor furniture on the exterior of a home according to select embodiments of the instant disclosure.

Referring now to FIG. 9, in another aspect, the instant disclosure embraces method 100 of delivering packages 50 inside outdoor furniture 10 on exterior 12 of home 14. In general, method 100 of delivering packages 50 inside outdoor furniture 10 on exterior 12 of home 14 may include step 102 of providing outdoor furniture 10 for exterior 12 of home 14 in any of the various embodiments shown and/or described herein, including any of the various embodiments of piece 16 of outdoor furniture 10 containing fortified drop box 18 shown and/or described herein. With this provided outdoor furniture 10 containing fortified drop box 18, method 100 of delivering packages 50 inside outdoor furniture 10 on exterior 12 of home 14 may include step 104 of delivering home delivered packages 50 to home 14. This step 104 of delivering home delivered packages 50 to home 14 may include the steps of: step 106 of unlocking locking mechanism 22; step 108 of opening lid 20; step 110 of inserting home delivered packages 50 inside fortified drop box 18; step 112 of closing lid 20; and step 114 of locking locking mechanism 22 for securing home delivered packages 50 inside fortified drop box 18 contained within piece 16 of outdoor furniture 10.

In select embodiments of method 100 of delivering packages 50 inside outdoor furniture 10 on exterior 12 of home 14, when locking mechanism 22 of the provided outdoor furniture 10 includes combination device 42 configured for unlocking locking mechanism 22 and accessing fortified drop box 18 by owner 44, and scanner 46 configured for unlocking locking mechanism 22 and accessing fortified drop box 18 by delivery company 48, step 104 of delivering home delivered packages 50 to home 14 may further include the steps of: step 116 of scanning barcode 52 on home delivered packages 5—for unlocking locking mechanism 22 via delivery company 48; and step 118 of entering a combination into combination device 42 for retrieving home delivered packages 50 from fortified drop box 18 via owner 44.

In sum, the instant disclosure provides outdoor furniture 10 for exterior 12 of home 14 including piece 16 of functional outdoor furniture 24 containing fortified drop box 18. One feature of the instant disclosure may be that it may allow companies (like delivery company 48) to gain access to customers (like owner 44) fortified drop box 18 in order to secure delivered packages 50, while servicing as an outdoor seating arrangement, or the like. Piece 16 of outdoor furniture 10 containing fortified drop box 18 may have: an outer shell shaped and designed like functional outdoor furniture 24; a box/container making up fortified drop box 18 within piece 16 of outdoor furniture 10; locking mechanism 22; keypad 42 and barcode scanner 46 with power source, including battery power source 56 and/or wired electric power source 58.

A feature of the present disclosure of outdoor furniture 10 for exterior 12 of home 14 including piece 16 of functional outdoor furniture 24 containing fortified drop box 18 may be its ability to allow companies to gain easy access to fortified drop box 18 of owner 44 or a customer.

Another feature of the present disclosure of outdoor furniture 10 for exterior 12 of home 14 including piece 16 of functional outdoor furniture 24 containing fortified drop box 18 may be its ability to provide security for packages 50 delivered to the house 14.

Another feature of the present disclosure of outdoor furniture 10 for exterior 12 of home 14 including piece 16 of functional outdoor furniture 24 containing fortified drop box 18 may be its ability to have other practical use doubling as an outside bench 26 or sitting stool with optional potting/flowering options or planters 34.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. Outdoor furniture for an exterior of a home comprises:
   a piece of the outdoor furniture;
   a fortified drop box contained within the piece of the outdoor furniture, the fortified drop box has a lid configured to open for gaining access to the fortified drop box and to close for sealing the fortified drop box;
   a locking mechanism configured for securing the fortified drop box with the lid closed, the locking mechanism is also configured to selectively open for accessing the fortified drop box through the lid, the locking mechanism includes:
     a combination device configured for unlocking the locking mechanism and accessing the fortified drop box by an owner;
     a scanner configured for unlocking the locking mechanism and accessing the fortified drop box by a delivery company, whereby, the piece of the outdoor furniture is configured to allow delivery companies to gain access to the fortified drop box via the barcode scanner in order to secure home delivered packages inside the piece of the outdoor furniture;
     wherein the locking mechanism is configured to be opened by the delivery company via a one-time barcode on the home delivered packages configured to be scanned by the scanner for unlocking the locking mechanism a single time;
   a security system configured to prevent the piece of the outdoor furniture from being stolen, the security system includes a proximity sensor in communication with the piece of the outdoor furniture, wherein the proximity sensor is configured to determine when the piece of the outdoor furniture is removed from the exterior of the home; and an ergonomic lift positioned inside the fortified drop box, the ergonomic lift is configured to raise and lower home delivered packages on the ergonomic lift to a desired height;

the piece of the outdoor furniture is configured as a functional bench for seating with a back rest and side rails, where the lid of the fortified drop box is a seat portion of the functional bench.

2. The outdoor furniture of claim 1, wherein the locking mechanism is powered by a battery power source or a wired alternating current power source.

\* \* \* \* \*